(12) United States Patent
Rotzoll (10) Patent No.: US 8,493,519 B2
(45) Date of Patent: Jul. 23, 2013

(54) CHARGE RECOVERY SCHEME

(75) Inventor: Robert R. Rotzoll, Cascade, CO (US)

(73) Assignee: RealD Inc., Beverly Hills, CA (US)

( * ) Notice: Subject to any disclaimer, the term of this patent is extended or adjusted under 35 U.S.C. 154(b) by 294 days.

(21) Appl. No.: 13/102,948

(22) Filed: May 6, 2011

(65) Prior Publication Data

US 2011/0273634 A1  Nov. 10, 2011

Related U.S. Application Data

(60) Provisional application No. 61/332,732, filed on May 7, 2010.

(51) Int. Cl.
*G02F 1/1335* (2006.01)
(52) U.S. Cl.
USPC .......................................................... 349/13
(58) Field of Classification Search
USPC .......................................................... 349/13
See application file for complete search history.

(56) References Cited

U.S. PATENT DOCUMENTS

| | | | |
|---|---|---|---|
| 2004/0070350 A1* | 4/2004 | Kwak et al. | 315/169.3 |
| 2006/0077133 A1* | 4/2006 | Yang et al. | 345/68 |
| 2008/0129658 A1* | 6/2008 | Baek | 345/63 |
| 2013/0009929 A1* | 1/2013 | Tseng | 345/211 |

OTHER PUBLICATIONS

VESA Standard Connector and Signal Standards for Stereoscopic Display Hardware, Version 1 (Nov. 5, 1997).

* cited by examiner

*Primary Examiner* — Timothy L Rude
(74) *Attorney, Agent, or Firm* — Baker & McKenzie LLP (57) ABSTRACT

Shuttering eyewear (or shutter glasses) may be used to enable stereoscopic 3D and to provide different images to two viewers using a single display, known as Dual View. The shuttering eyewear may utilize charge recovery circuits. The charge recovery circuits may achieve high charge recovery efficiencies on the order of 80 to 90 percent resulting in a dramatic reduction in power supply battery operating current and a resulting increase in operating time. The charge recovery circuits may utilize switch mode boost conversion to recover most of the charge from a shutter that is being closed to one that is to be opened. Further, a charge recovery method for utilizing energy stored on a capacitive storage device may include closing a first active shutter, moving charge to a converter in buck mode to a capacitor, and pulling charge from the capacitor to open a second shutter.

9 Claims, 9 Drawing Sheets

CHARGE RECOVERY SCHEME

CROSS-REFERENCE TO RELATED APPLICATIONS

This application claims priority to U.S. Provisional Patent Application Ser. No. 61/332,732, filed May 7, 2010, entitled "Shutter-glass eyewear charge recovery scheme," the entirety of which is herein incorporated by reference.

TECHNICAL FIELD

This disclosure generally relates to a charge recovery scheme and, more particularly, to a shutter-glass eyewear shutter charge recovery scheme.

BACKGROUND

Shuttering eyewear (or shutter glasses) can be used to enable stereoscopic 3D and to provide different images to two viewers using a single display, known as Dual View. These devices utilize an infrared (IR) signal generated by an IR emitter which is compliant with VESA Standard Connector and Signal Standards for Stereoscopic Display Hardware, Version 1 (Nov. 5, 1997), which is herein incorporated by reference. As described in the standard, an emitter outputs a very simple pulse width modulated signal to indicate which eye to activate. The eyewear responds by performing a hard-coded sequence of switching events which open and close the eyewear shutters in order to achieve the desired visual effect. The hard-coded switching sequence is generally either a compromise which provides acceptable performance for a small set of displays or is optimized for a single display.

BRIEF SUMMARY

Generally, disclosed is a scheme to achieve high charge recovery efficiencies on the order of approximately 80 to 90 percent resulting in a dramatic reduction in power supply battery operating current and a resulting increase in operating time.

According to an aspect, generally, the present application discloses stereoscopic eyewear for receiving a signal, including a first and second lens, a circuit for recovering charge, and a frame. The first lens includes a first liquid crystal (LC) shutter and the second lens includes a second LC shutter. The circuit for recovering charge from at least the first liquid crystal shutter includes a first, second and third switches, and a first capacitor. The first switch is operable to selectively allow charge to flow from the first liquid crystal shutter to a first inductor. The first capacitor is operable to receive charge from at least the first inductor. The second switch is operable to selectively regulate the charge from the first inductor to the first capacitor. The third switch is operable to selectively maintain an approximately zero voltage on the first LC shutter. The frame holds the first lens, the second lens and the circuit for recovering charge from.

According to another aspect, generally, the present application discloses a charge recovery method utilizing energy stored on a capacitive storage device. The method includes closing a first switch (SLR), which allows a first liquid crystal cell to charge a first inductor. The method also includes increasing the voltage on a first capacitor by alternately opening and closing a second switch (SREC) until the voltage is discharged from the first liquid crystal cell. The method also includes closing a third switch (SLG) to maintain an approximately zero voltage on the first liquid crystal cell.

According to yet another aspect, generally, the present application discloses a charge recovery circuit utilizing energy stored on a capacitive storage device. The circuit includes a first, second and third switch, and a first capacitor. The first switch (SLR) is operable to selectively allow a first liquid crystal cell to charge a first inductor. The first capacitor is operable to receive charge from the first liquid crystal cell by alternately opening and closing the second switch until the voltage is substantially discharged from the first liquid crystal cell. The third switch is operable to selectively maintain an approximately zero voltage on the first liquid crystal cell.

According to a further aspect, generally, the present application discloses a charge recovery method for utilizing energy stored on a capacitive storage device. The method includes closing at least a first switch to allow charge to flow from the capacitive storage device to a first inductor. The method also includes charging the first inductor for a first charge time, closing at least a second switch to allow charge to flow from the first inductor to a first capacitor, and charging the first capacitor for a first discharge time.

According to a further aspect, generally, the present application discloses a charge recovery circuit utilizing energy stored on a capacitive storage device. The charge recovery circuit includes a first and second switch, a first inductor, and a first capacitor. The first switch is operable to selectively allow charge to flow from the capacitive storage device to the first inductor, wherein the first inductor charges for a first charge time, and the second switch is operable to selectively allow charge to flow from the first inductor to the first capacitor, wherein the first capacitor charges for a first discharge time.

According to another aspect, generally, the present application discloses a charge recovery method for utilizing energy stored on a capacitive storage device. The method includes closing a first active shutter, moving charge to a converter in buck mode to a capacitor, and pulling charge from the capacitor to open a second shutter.

According to yet another aspect, generally, the present application discloses a display system for utilizing energy stored on a capacitive storage device. The system includes a display screen, a first liquid crystal (LC) shutter, and a circuit for recovering charge from the LC shutter. The first liquid crystal shutter is adjacent to the display screen. The circuit for recovering charge from at least the first liquid crystal shutter is operable to close the first liquid crystal shutter when the liquid crystal shutter is in an active state, move charge to a converter in buck mode to a capacitor, and pull charge from the capacitor to open a second liquid crystal shutter.

Other features are apparent with reference to the detailed description, the drawings and the appended claims.

DETAILED DESCRIPTION

Following is a description of the 3D eyewear shutter charge recovery scheme.

Conventional Shutter Charge Recovery Schemes

Figure 1:
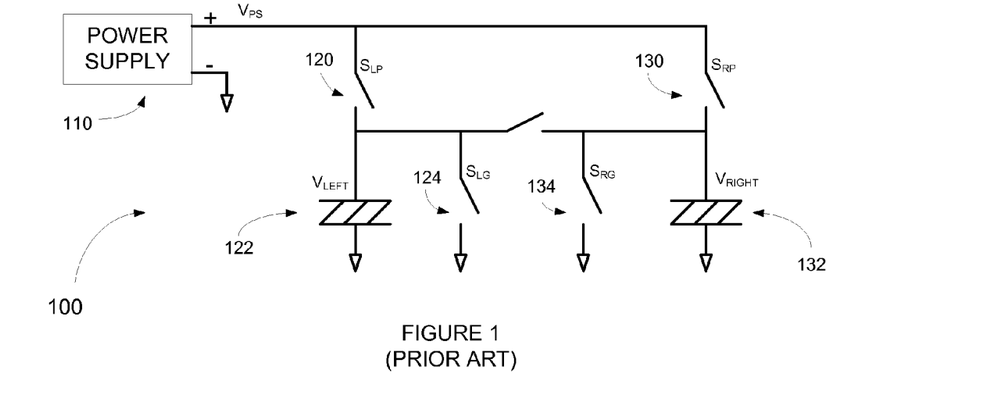
FIG. 1 is a schematic diagram of a conventional shutter charge recovery circuit.

FIG. 1 is a schematic diagram of a conventional 3D eyewear shutter charge recovery scheme. This circuit 100 utilizes charge sharing to recover some of the charge from a shutter that is being closed to one that is to be opened. A single polarity circuit is shown for simplicity; H-bridge circuitry to support polarity change on the shutter voltages is not shown. The two shutters are liquid crystal (LC) cells that have equal capacitance. The envelope detector responds to changes in the amplitude of the input signal, if the band pass filter was not included in the circuit 100. The band pass filter is designed to attenuate the effects of interfering signals and random noise, while passing the desired signal to the demodulator.

As shown in FIG. 1, a conventional 3D eyewear shutter charge recovery circuit 100 includes a power supply 110, a first liquid crystal (LC) shutter 122, a second LC shutter 132, a first switch $S_{LP}$ 120, a third switch $S_{RP}$ 130, a fourth switch $S_{RG}$ 134 and a fifth switch $S_{SHARE}$ 140. The term switch as used herein may refer to any solid state device or optical device such as, but not limited to, any variation of a diode, a transistor, a relay, and so forth. Additionally, as discussed herein, the terms "open" and "closed" may be used when referring to switches. For discussion purposes only and as used herein, the term "open" may be used to describe the position of a switch that may substantially prevent current from flowing across the switch. Additionally herein, the term "closed" may be used to describe the position of a switch that may allow current to flow across the switch. In alternative embodiments, the term "open" may describe a switch that allows current to flow and the term "closed" may describe a switch that substantially prevents current from flowing.

In operation and as shown in FIG. 1, the $S_{LP}$ switch 120 and $S_{RP}$ switch 130 are used to allow or to prevent charge to flow from the power supply 110 to the first LC shutter 122 and/or the second LC shutter 132, respectively. The first LC shutter 122 and the second LC shutter 132 behave as capacitive storage devices and open and close depending on the charge of the LC shutters. In one example, the first LC shutter may be charged and switches to a high state and open, thus substantially allowing light to pass through the liquid crystal. Further, the first LC shutter may discharge and switch to a low state and close, thus substantially preventing light from passing through the liquid crystal. In FIG. 1, once the LC shutter is in a closed state or discharged, switch $S_{LG}$ 124 and/or switch $S_{RG}$ 134 close and hold the first LC shutter 122 and/or the second LC shutter 132, respectively, at a zero charge.

As discussed herein, the term "open" may be used to describe the substantially charged state of an LC shutter and the term "closed" may be used to describe a substantially discharged state of an LC shutter. These terms are used for explanatory purposes only and in alternative embodiments, the LC shutter may be "open" when the LC shutter is discharged, thus substantially allowing light to pass through and vice versa. Additionally, in other embodiments, the LC shutter may switch polarization states depending on the charge state of the LC shutter.

Figure 2:
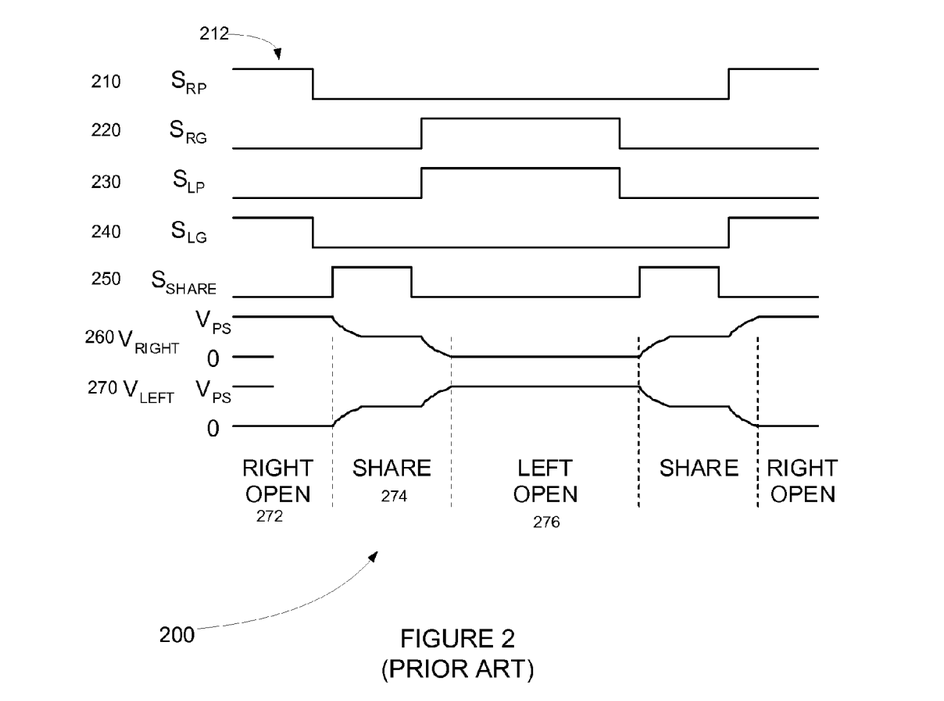
FIG. 2 is a timing diagram of conventional shutter charge recovery timing.

FIG. 2 is a timing diagram 200 illustrating conventional shutter charge recovery circuit timing. As used herein, the first LC shutter 122 of FIG. 1 may be referred to as the "left shutter", and the second LC shutter 132 of FIG. 1 may be referred to as the "right shutter", for explanatory purposes only. In FIG. 2, starting with switch $S_{RP}$ 210 enabled (logic high 212 on diagram), the voltage on the right shutter $V_{RIGHT}$ 260 is equal to the shutter power supply $V_{PS}$ and the right shutter is open and passes light. In FIG. 2, the time period in which the right shutter is open is illustrated as the area RIGHT OPEN 272. Simultaneously, switch $S_{LG}$ 240 is enabled and forces the left shutter closed to block light. The remaining switches $S_{RG}$ 220 and $S_{LP}$ 230 are all off. At the end of the period of the right shutter being open, the $S_{RP}$ 210 and $S_{LG}$ 230 switches are both disabled. Next, in the area SHARE 274, the $S_{SHARE}$ switch 250 is enabled resulting in a capacitive charge sharing action between the two equal-size shutters. Therefore, during this time both shutters will achieve one-half $V_{PS}$ as illustrated along $V_{RIGHT}$ 260 and $V_{LEFT}$ 270 in the area SHARE 274. The total charge recovered during this action is one-half of the full shutter charge. The $S_{SHARE}$ switch 250 is then disabled followed by the enabling of switches $S_{LP}$ 230 and $S_{RG}$ 220. The remaining charge on the right shutter is shunted to ground and the left shutter voltage $V_{LEFT}$ 270 reaches $V_{PS}$ illustrated as area LEFT OPEN 276, resulting in the opening of the left shutter and the closing of the right. The operation may be reversed to switch the open state from the left shutter back to the right shutter.

This scheme recovers roughly one-half of the charge applied to the shutters. A switch between shutters is performed with approximately no dead time when both shutters are closed. This results in left-right image cross-talk and allows for no duty-cycle control of brightness or other system image control effects.

To resolve the duty cycle limit, a temporary storage capacitor can act as an intermediary for the charge, but will divide the recovered charge by two again resulting in a total charge recovery of one-fourth of the original charge. Substantially all un-recovered charge is dissipated in the switches during switching action. Thus, the aforementioned conventional system will give some charge recovery but the best usable efficiency for a high quality system will be on the order of approximately 20 to 25 percent.

What is needed is a method to achieve high charge recovery efficiencies on the order of approximately 80 to 90 percent resulting in a reduction in power supply battery operating current and a resulting increase in operating time.

Eyewear Shutter Charge Recovery Scheme

Figure 3:
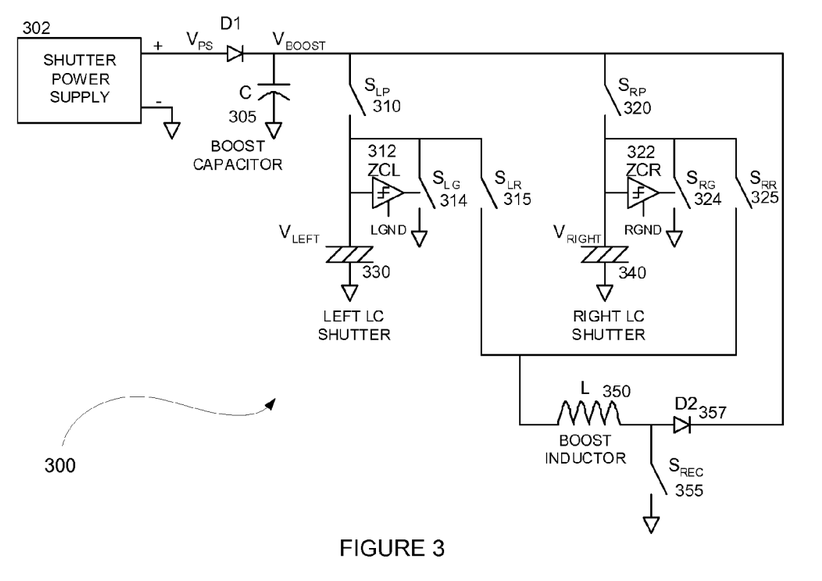
FIG. 3 is a schematic diagram of an embodiment of a shutter charge recovery circuit, in accordance with the present disclosure.

FIG. 3 is a schematic diagram of an embodiment of an eyewear shutter charge recovery scheme. This circuit 300 may utilize switch mode boost conversion to recover most of the charge from a shutter that is being closed to one that is to be opened. A single polarity circuit is shown for simplicity; standard H-bridge circuitry to support polarity change on the shutter voltages is not shown. The two shutters are liquid crystal (LC) cells that have substantially equal capacitance. Additionally, although the elements may be arranged in a specific configuration, the arrangement of the elements may be varied in accordance with the embodiments set forth herein.

In operation, circuit 300 may include switches $S_{LP}$ 310 and $S_{RP}$ 320 which may be used to charge the left LC shutter 330 and right LC shutter 340 to approximately the $V_{BOOST}$ voltage to open the associated shutter. Closing each of the shutters 330 or 340 may be performed by closing switches $S_{LR}$ 315 or $S_{RR}$ 325 to substantially route the appropriate shutter charge to the boost inductor L 350 and closing $S_{REC}$ 355 to begin flux charging of the inductor 350. Switch $S_{REC}$ 355 can be opened at a rate to limit the current from the shutter. Whenever switch $S_{REC}$ 355 is opened, the current in inductor 350 may drive the boost capacitor C 305 via diode D2 357 and may increase $V_{BOOST}$. The value of boost capacitor C 305 may be a multiple of the capacitance of a shutter which may reduce the overall voltage variation on $V_{BOOST}$. The elements inductor 350, diode D2 357, switch $S_{REC}$ 355 and capacitor C 305 may comprise a boost converter which may efficiently move charge from either of the shutters to the boost capacitor C 305 for re-use by a shutter at a future time. This boost operation may continue until the shutter charge has been depleted. Zero-crossing detectors ZCL 312 and ZCR 322 may detect the voltage on the associated shutter and upon crossing the zero voltage, or ground level, may cause the associated grounding switch $S_{LG}$ 314 or $S_{RG}$ 324 to become enabled and signal the system to stop recovering charge. Suitable latching action on the zero crossing detector outputs are controlled by LGND and RGND to force the associated shutter to remain in the zero voltage state. Losses in the switches, shutters, boost inductor and diode may limit the maximum recoverable charge, but high percentage values at or above 80 percent may be achievable.

Note that once charge has been recovered, it remains in the boost capacitor 305 until used to open a shutter. The shutter power supply 302 may add further charge to approximately maintain the $V_{BOOST}$ voltage at the appropriate level to drive the shutters. In a preferred embodiment, the power supply 302 may not charge the boost capacitor until the charge recovery process is completed and the voltage may not rise above that necessary for normal operation. Since charge recovery is independent for each shutter, cross-talk conditions can be eliminated and duty cycle control may be possible with little to no impact on charge recovery effectiveness.

Figure 4:
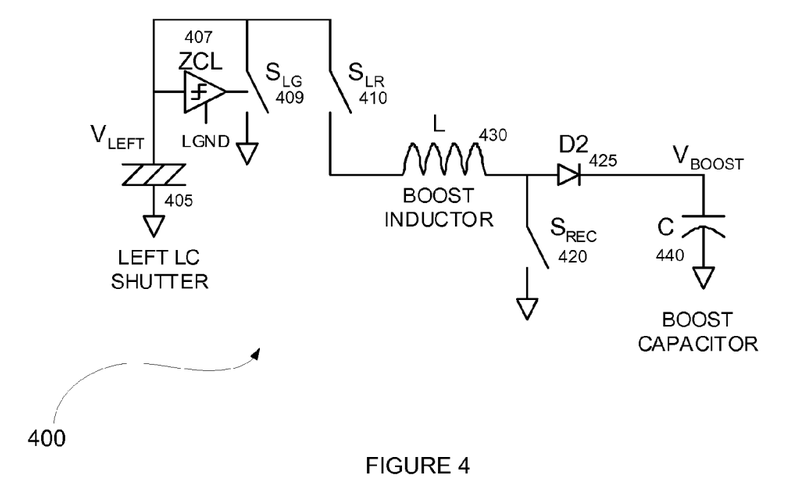
FIG. 4 is a schematic diagram of an embodiment for recovering left shutter charge, in accordance with the present disclosure.
Figure 5:
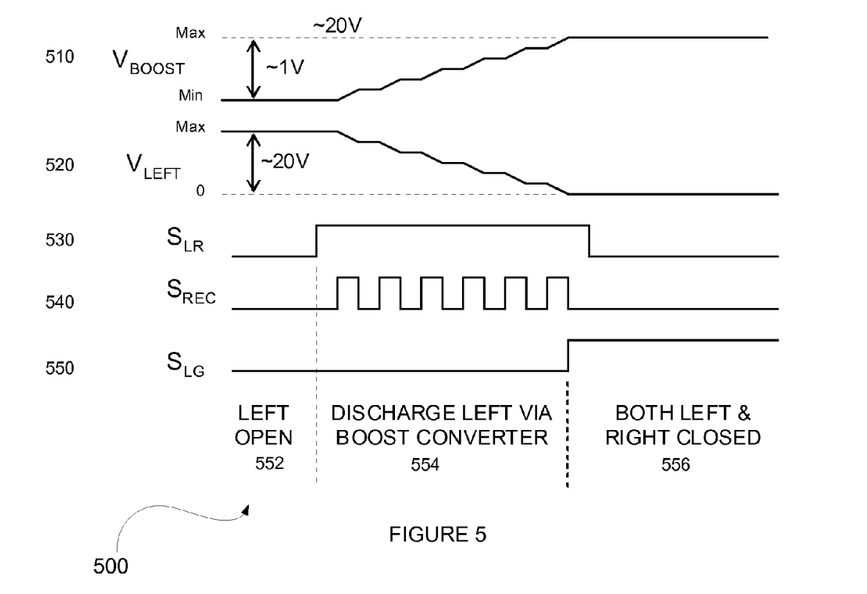
FIG. 5 is a timing diagram of an embodiment for recovering left shutter charge, in accordance with the present disclosure.

FIG. 4 is a schematic diagram of a simplified circuit 400 showing the primary elements to recover charge from the left shutter. FIG. 5 is a timing diagram showing the associated timing for recovering left shutter charge for circuit 400.

In the operation of circuit 400 of FIG. 4, the switch $S_{LR}$ 410 is closed to begin operation. Switch $S_{REC}$ 420 is then alternately closed and opened at an appropriate rate to limit output current from the shutter. When switch $S_{REC}$ 420 is closed the boost inductor L 430 charges. When switch $S_{REC}$ 420 opens the current in inductor L 430 passes through diode D2 425 and increases the $V_{BOOST}$ voltage incrementally on the boost capacitor C 440. This operation continues until $V_{LEFT}$ on left LC shutter 405 reaches zero as detected by zero-crossing detector ZCL 407 at which time switch $S_{LG}$ 409 is closed to hold $V_{LEFT}$ at zero volts resulting in a closed left LC shutter 405. At this point there may be little to no charge to recover and switch $S_{LR}$ 410 is opened.

FIG. 5 is a timing diagram of an embodiment for recovering left shutter charge. In the timing diagram 500, the switch $S_{LR}$ 530 may be closed to begin operation as shown in area LEFT OPEN 552. Additionally, the voltage on the left LC shutter $V_{LEFT}$ 520 may be at an approximately maximum value while the voltage $V_{BOOST}$ 510 on the inductor may be a minimal value. Next, switch $S_{REC}$ 540 may be alternately open and closed at a rate that may regulate the output current from the shutter. As shown in the area DISCHARGE LEFT VIS BOOST CONVERTER 554, when SREC 540 is closed, the voltage $V_{BOOST}$ may increase on the inductor and when SREC is open, the current in the inductor may pass through the diode D2 and may increases the $V_{BOOST}$ voltage incrementally on the boost capacitor. This operation may continue until $V_{LEFT}$ reaches zero as may be detected by zero-crossing detector ZCL. Once the zero-crossing detector detects that the shutter voltage is approximately zero, the switch $S_{LG}$ may close (shown as a high state in $S_{LG}$ 550) to hold $V_{LEFT}$ 520 at approximately zero volts which may result in a closed left LC shutter, as shown along $V_{LEFT}$ 520 in area BOTH RIGHT & LEFT CLOSED 556.

Figure 6:
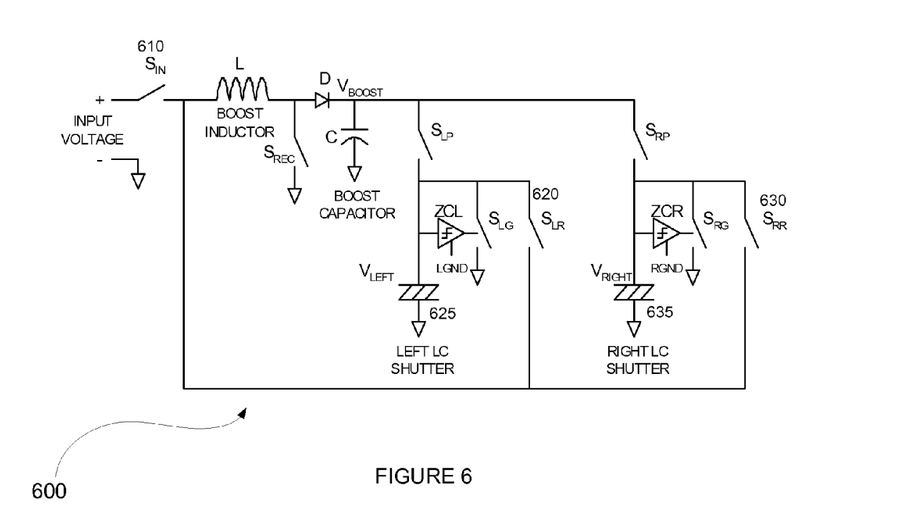
FIG. 6 is a schematic diagram of an embodiment of a single-inductor shutter charge recovery including input boost, in accordance with the present disclosure.

FIG. 6 is a schematic diagram of an embodiment of a single-inductor shutter charge recovery including input boost. The schematic diagram of FIG. 6 is a modification of a charge recovery circuit that may use a boost converter to generate and maintain $V_{BOOST}$ from a low voltage power supply such as a battery. The boost converter may be shared between the power supply input and the shutters via switches $S_{IN}$ 610, $S_{LR}$ 620 and $S_{RR}$ 630. In one embodiment, only one of $S_{IN}$ 610, $S_{LR}$ 620, and $S_{RR}$ 630 may be enabled at a time.

$S_{IN}$ 610 may be enabled to use the boost converter to generate a high $V_{BOOST}$ voltage from the power supply. $S_{LR}$ 620 and $S_{RR}$ 630 may be used to recover charge from the left shutter 625 and/or the right shutter 635, respectively, as previously described. With the charge recovery scheme running, the power supply may add as much power as was lost during the initial shutter charging and during the charge recovery process. If 80 percent efficiency is achieved, then the input power supply may provide 20 percent of the shutter power.

Figure 7:
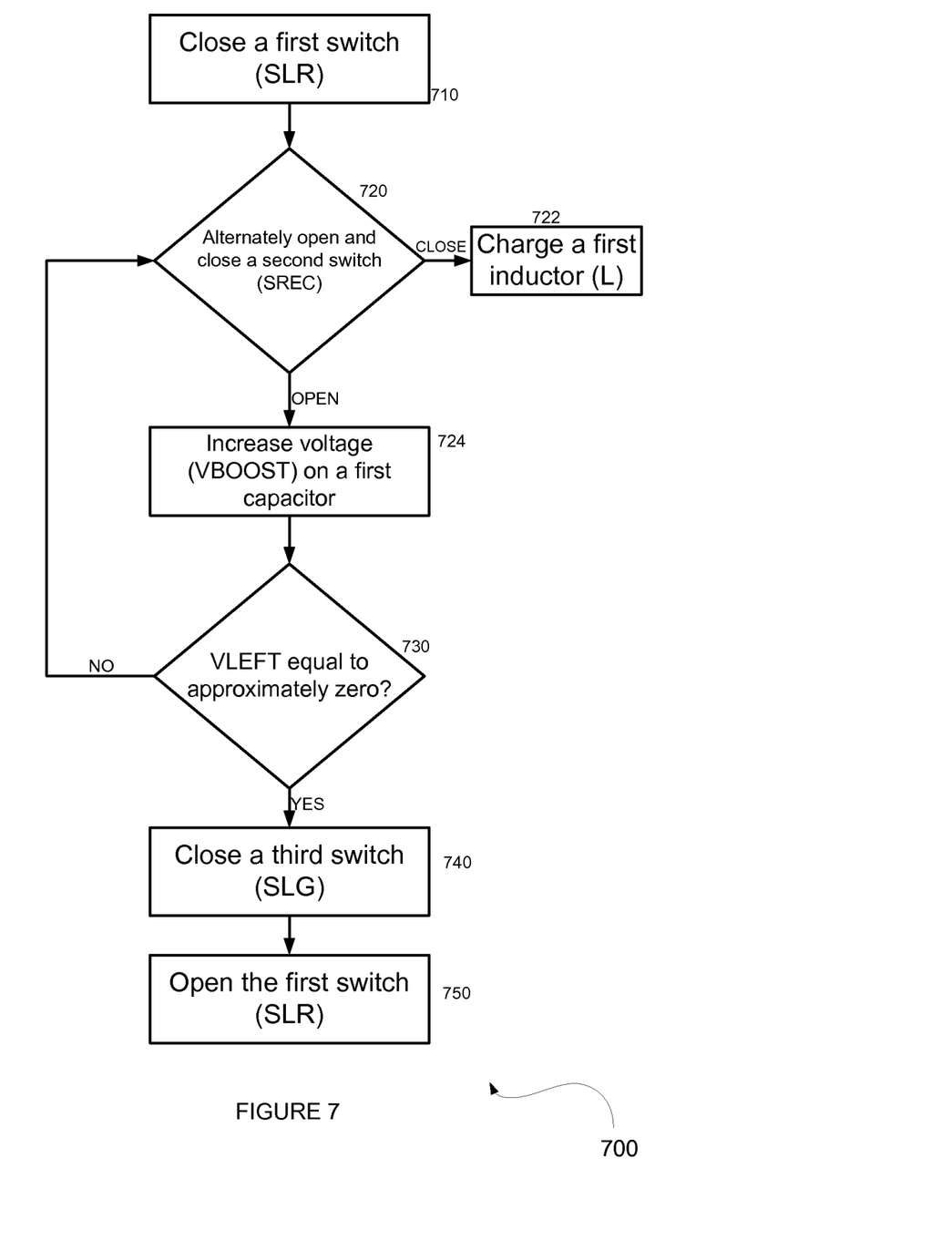
FIG. 7 is a flow diagram illustrating operations of one embodiment of a charge recovery method, in accordance with the present disclosure.

FIG. 7 is a flow diagram illustrating operations of one embodiment of a charge recovery method that uses a boost converter to generate and maintain $V_{BOOST}$ from a low voltage power supply such as a battery. Although the flowchart includes operations in a specific order, it may be possible to perform the operations in a different order, and it also may be possible to omit operations as necessary. The flow diagram may begin with the operation of block 710 with closing a first switch SLR. Next in the operation of block 720, a second switch SREC may alternately open and close. When the second switch SREC is closed, the inductor may be charged as shown in the operation of block 722. When the second switch SREC is open, the voltage on the capacitor may be increased as shown in the operation of block 724.

In the operation of block 730, a zero-crossing detector may verify whether the voltage on the corresponding shutter is approximately equal to zero. In the case the voltage on the corresponding shutter is not approximately zero, the second switch SREC may continue to alternately open and close, as shown in the operation of block 720. In the case the voltage on the corresponding shutter is approximately equal to zero, a third switch SLG may close as shown in the operation of block 740. The first switch SLR may then close as shown in the operation of block 750.

Figure 8:
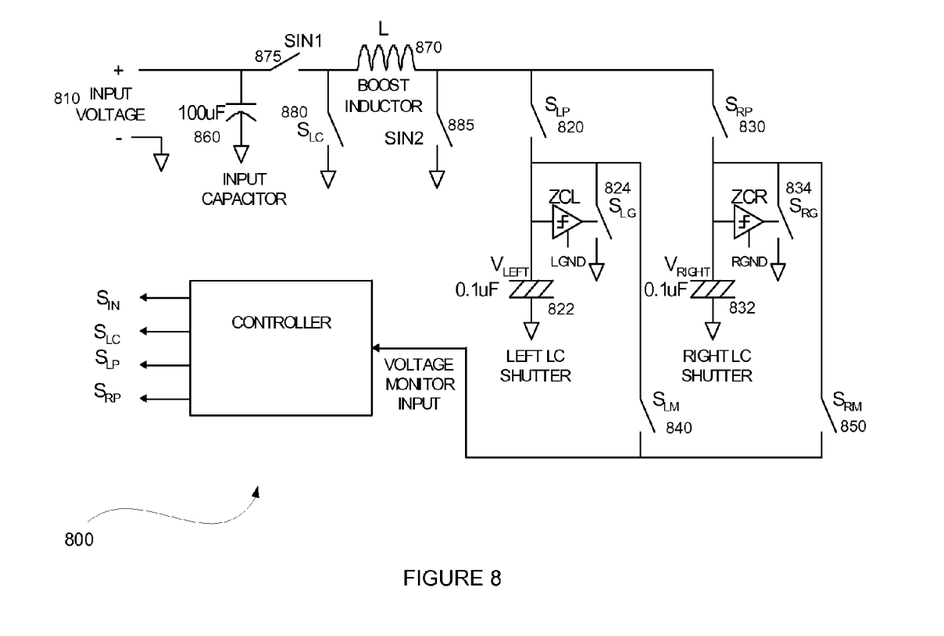
FIG. 8 is a schematic diagram of an embodiment for recovering shutter charge, in accordance with the present disclosure.

FIG. 8 is a schematic diagram of an embodiment for recovering shutter charge. The circuit 800 of FIG. 8 may re-use charge stored in shutters. As shown in FIG. 8, the shutter charge recovery circuit 800 may include at least a power supply 810, a first liquid crystal (LC) shutter 822, a second LC shutter 832, a first switch $S_{LP}$ 820, a second switch $S_{LG}$ 824, a third switch $S_{RP}$ 830, a fourth switch $S_{RG}$ 834 and a fifth and a sixth switch $S_{LM}$ 840 and $S_{RM}$ 850, respectively. The circuit 800 may further include an input capacitor 860, a boost inductor 870, and at least three more switches SIN1 875, $S_{LG}$ 880, and SIN2 885. The circuit 800 and the aforementioned components will be discussed in further detail herein with respect to FIGS. 9 and 10.

In one embodiment, circuit 800 may include a modified boost converter that may directly drive the shutters and may utilize switch mode boost conversion to recover most of the charge from a shutter that is being closed to one that is to be opened. Similar to FIG. 3, circuit 800 of FIG. 8 may be illustrated as a single polarity circuit is shown for simplicity; standard H-bridge circuitry to support polarity change on the shutter voltages is not shown. The two shutters are liquid crystal (LC) cells that have substantially equal capacitance. Additionally, although the elements may be arranged in a specific configuration, the arrangement of the elements may be varied in accordance with the embodiments set forth herein.

In operation and in one example, circuit 800 may include a modified converter which may generate voltages in the approximate range of 0 to 20 volts from an approximately 2.2 volt battery supply. By using a substantially similar converter and substantially similar waveforms for most to approximately all states may produce charge balance on the LC shutters. Additionally, monitoring voltage at a shutter for converter controller may eliminate some of the impact of variable switch resistance. Continuing the example of circuit 800, an active shutter may close and may move charge to the converter in buck mode to an input capacitor and may pull charge from the input capacitor to open the alternate shutter.

Figure 9A:
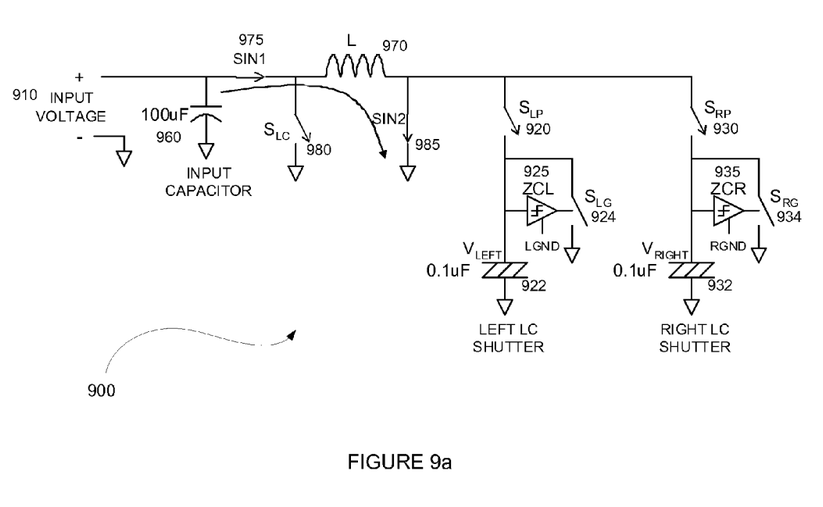
FIG. 9a is a schematic diagram of an embodiment illustrating charging of an LC shutter, in accordance with the present disclosure.
Figure 9B:
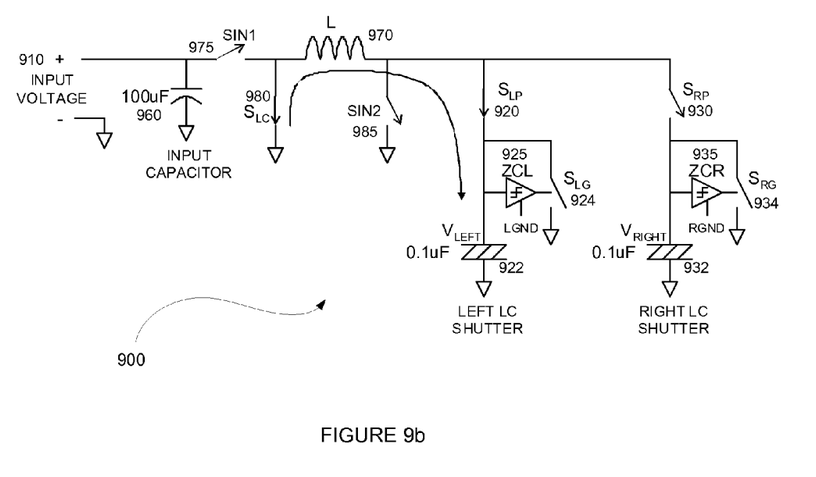
FIG. 9b is a schematic diagram of an embodiment illustrating charging of an LC shutter, in accordance with the present disclosure.

FIGS. 9a and 9b are schematic diagrams of an embodiment illustrating charging of an LC shutter circuit 900. Circuit 900 may be configured as part of circuit 800. Also, as used herein, the first LC shutter may be referred to as the "left shutter", and the second LC shutter may be referred to as the "right shutter", for explanatory purposes only. In the operation of circuit 900 and as shown in FIG. 9a, switches SIN1 975 and SIN2 985 may be closed at approximately the same time, which may allow an input voltage from the power supply 910 to be applied to boost inductor 970. The boost inductor 970 may continue to charge for a total charge time, in which the total charge time may or may not be a predetermined time, and may also be based on a component voltage limit.

Next, as shown in FIG. 9b, once the total charge time has been reached, switches SIN1 975 and SIN2 985 may be opened, thus preventing the boost inductor 970 from continuing to charge. Next, switches $S_{LC}$ 980 and $S_{LP}$ 920 may be closed, which may allow the current from boost inductor 970 to discharge into the left LC shutter 922. The voltage in the left LC shutter 922 may rise to a peak defined by a second total discharge time of the boost inductor 970. The right LC shutter 932 may be similarly charged by closing switches $S_{RG}$ 934 and $S_{RP}$ 930. Generally, the left LC shutter 922 and the right LC shutter 932 may not charge at approximately the same time.

Figure 10A:
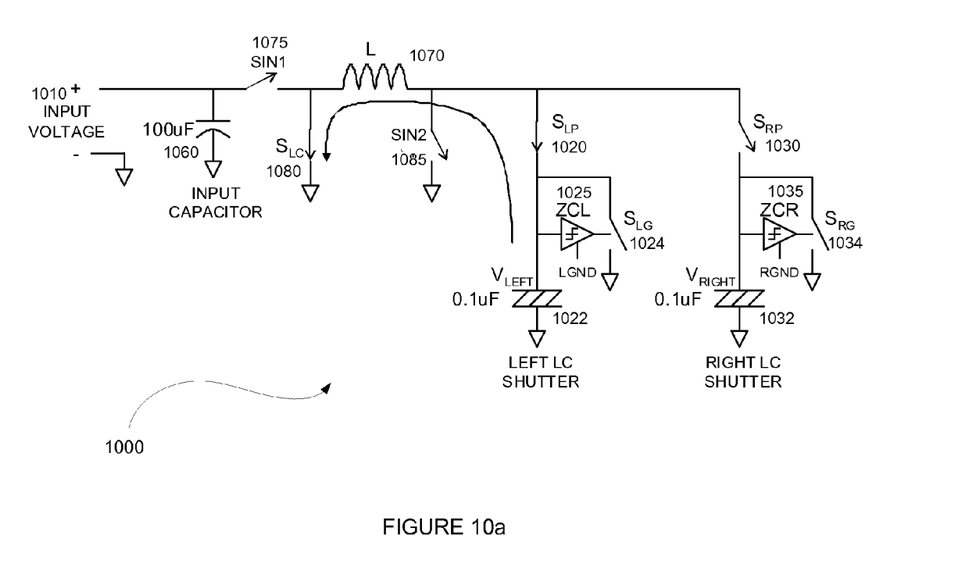
FIG. 10a is a schematic diagram of an embodiment illustrating discharging of an LC shutter, in accordance with the present disclosure.
Figure 10B:
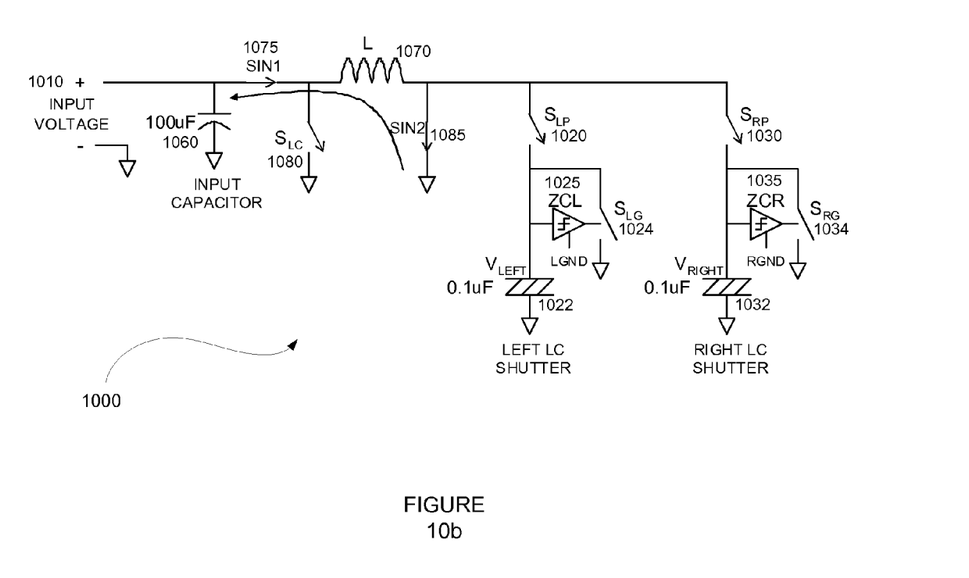
FIG. 10b is a schematic diagram of an embodiment illustrating discharging of an LC shutter, in accordance with the present disclosure.

FIGS. 10a and 10b are schematic diagrams of an embodiment illustrating discharging of an LC shutter circuit 1000. Circuit 1000 may be configured as part of circuit 800. In the operation of circuit 1000 and as illustrated in FIG. 10a, switches $S_{LC}$ 1080 and $S_{LP}$ 1020 may be closed at approximately the same time, which may allow the left LC shutter 1022 to charge the boost inductor 1070. The current in the boost inductor 1070 may continue to rise to a peak which may be defined by a second total charge time, in which the second total charge time may or may not be a predetermined time, and may also be based on a component voltage limit.

Next and as illustrated in FIG. 10b, once the current peak of the boost inductor 1070 has been reached, switches SIN1 1075 and SIN2 1085 may be closed and switches $S_{LC}$ 1080 and $S_{LP}$ 1020 may be opened, thus allowing the boost inductor 1070 to discharge into the input capacitor 1060. The voltage in the input capacitor 1060 may rise to a peak defined by a third total discharge time, in which the third total charge time may or may not be a predetermined time, and may also be based on a component voltage limit.

This boost operation may continue until the shutter charge has been depleted. Zero-crossing detectors ZCL 1025 and ZCR 1035 may detect the voltage on the associated shutter and upon crossing the zero voltage, or ground level, may cause the associated grounding switch $S_{LG}$ 1024 or $S_{RG}$ 1034 to become enabled and signal the system to stop recovering charge. Suitable latching action on the zero crossing detector outputs are controlled by LGND and RGND to force the associated shutter to remain in the zero voltage state. Losses in the switches, shutters, boost inductor and diode may limit the maximum recoverable charge, but high percentage values at or above approximately 80 percent may be achievable.

Note that once charge has been recovered, it remains in the boost capacitor 1075 until used to open a shutter. The shutter power supply 1010 may add further charge to approximately maintain the $V_{BOOST}$ voltage at the appropriate level to drive the shutters. In one embodiment, the power supply 1010 may not charge the boost capacitor 1060 until the charge recovery process is completed and the voltage may not rise above that necessary for normal operation. Since charge recovery is independent for each shutter, cross-talk conditions can be eliminated and duty cycle control may be possible with little to no impact on charge recovery effectiveness.

The embodiments discussed herein may be used in various systems. For example, the charge recovery circuits may be included in any type of optical or electrical system. Stated differently, the charge recovery circuits may be included in projection systems, display systems, shutter eyewear, monitors, entertainment systems, and so on. Additionally, the circuits herein may be a circuit, an integrated circuit, mounted on a printed circuit board, an element in a system on a chip, mounted on a bread board, and so forth.

Figure 11:
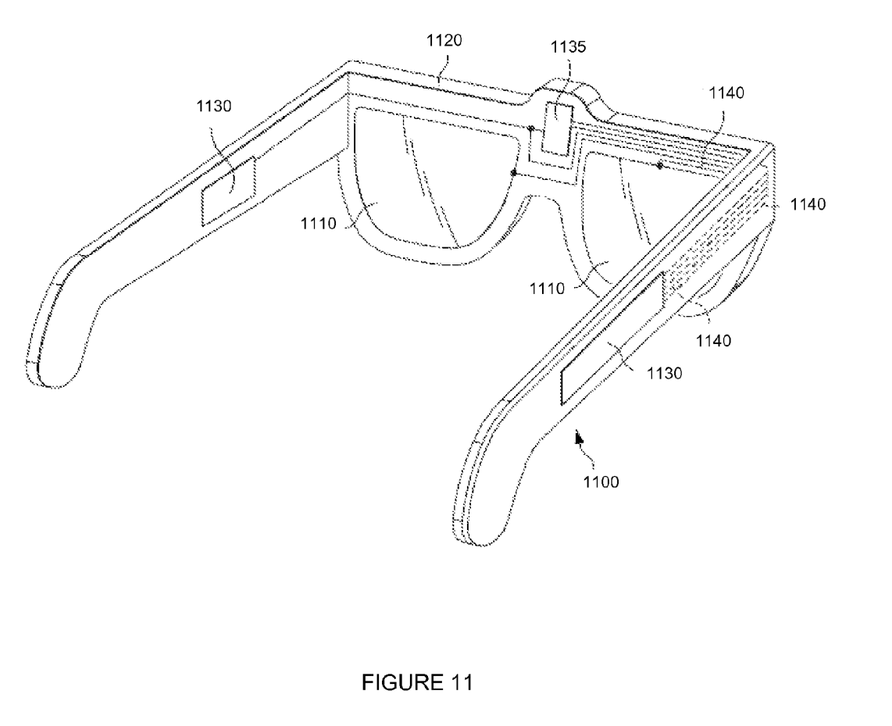
FIG. 11 is a schematic diagram of an embodiment of shutter glass eyewear, in accordance with the present disclosure.

FIG. 11 is a schematic diagram of an embodiment of shutter glass eyewear 1100. The shutter glass eyewear 1100 of FIG. 11 may include a first lens and a second lens 1110, a frame 1120, and an integrated circuit 1130 which may perform a variety of functions including, but not limited to, receiving infrared signals and filtering out interference from the infrared signals. As may be referred to herein for explanatory purposes, the integrated circuit 1130 may be a circuit or an integrated circuit, either or both of which may be included on a system on a chip, included on a printed circuit board, and so forth.

As shown in FIG. 11, the integrated circuit 1130 may be located in at least one of the shutter glass eyewear arms and may communicate with other integrated circuits 1130 or with a sensor 1135, such as, but not limited to an infrared sensor, via a wire 1140 or any other type of connector known in the art. Additionally, the integrated circuit 1130 may be one of multiple circuits, located in multiple places in the shutter glass eyewear 1100. In one example, the integrated circuit 1130 may be located in a first arm of the shutter glass eyewear 1110 and may communicate with additional integrated circuits located in the nose piece and/or the second arm of the shutter glass eyewear 1110.

Figure 12:
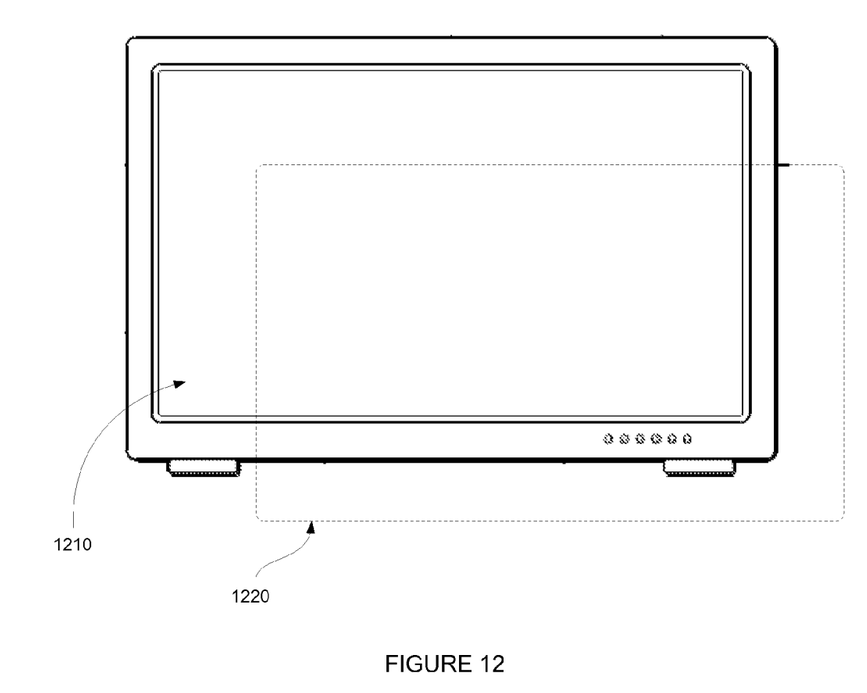
FIG. 12 is a schematic diagram of an embodiment of a display with a liquid crystal shutter, in accordance with the present disclosure.

FIG. 12 is a schematic diagram of an embodiment of a display with a liquid crystal shutter. The display 1200 with a liquid crystal shutter of FIG. 12 may include a display screen 1210 and a liquid crystal shutter 1220. The liquid crystal shutter 1220 may substantially overlay the display screen 1210, but is shown in an offset position in FIG. 12 for discussion purposes. As previously discussed herein, the liquid crystal shutter 1220 may substantially allow or prevent light from passing through. Additionally, as previously discussed, an integrated circuit (not shown in FIG. 12), may charge the liquid crystal shutter 1220 and may also receive charge from the liquid crystal shutter 1220. The integrated circuit may be located in various places such as, but not limited to, on the liquid crystal shutter 1220, on the display screen 1210, in the body of the display 1200, the frame surrounding the display screen, and so forth.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A charge recovery circuit utilizing energy stored on a capacitive storage device, comprising: a first switch (SLR) operable to selectively allow a first liquid crystal cell to charge a first inductor; a first capacitor operable to receive charge from the first liquid crystal cell by alternately opening and closing a second switch until the voltage is substantially discharged from the first liquid crystal cell; and a third switch operable to selectively maintain an approximately zero voltage on the first liquid crystal cell.

2. The charge recovery circuit of claim 1, wherein the first liquid crystal cell limits the output current by alternately opening and closing a second switch (SREC).

3. The charge recovery circuit of claim 2, wherein the first inductor charges when the second switch (SREC) closes.

4. The charge recovery circuit of claim 2, wherein current in the first inductor transfers to a diode when the second switch (SREC) opens.

5. The charge recovery circuit of claim 4, wherein the diode allows the voltage on the first capacitor to incrementally increase.

6. The charge recovery circuit of claim 1, further comprising a zero-crossing detector operable to detect the voltage on the first liquid crystal cell.

7. The charge recovery circuit of claim 1, further comprising a third switch (SLG) operable to close after the voltage on the first liquid crystal cell is approximately zero.

8. The charge recovery circuit of claim 7, wherein closing the third switch (SLG) holds the voltage on the first liquid crystal cell at approximately zero volts.

9. The charge recovery circuit of claim 8, wherein holding the voltage on the first liquid crystal cell at approximately zero volts further comprises closing the first liquid crystal cell.

\* \* \* \* \*